United States Patent [19]

Kishimoto et al.

[11] Patent Number: 4,637,889

[45] Date of Patent: Jan. 20, 1987

[54] ORGANOPOLYSILOXANE VISCOUS COUPLER FLUIDS

[75] Inventors: Keiichi Kishimoto; Makoto Yoshitake, both of Chiba, Japan

[73] Assignee: Toray Silicone Co., Ltd., Tokyo, Japan

[21] Appl. No.: 825,518

[22] Filed: Feb. 3, 1986

[30] Foreign Application Priority Data

Feb. 12, 1985 [JP] Japan ................................ 60-25070

[51] Int. Cl.$^4$ ...................... C10M 107/50; C07F 7/08
[52] U.S. Cl. .......................................... 252/75; 252/9; 252/49.7; 252/74; 252/78.3; 528/10; 528/30; 556/10; 556/401; 556/450; 556/453
[58] Field of Search ...................... 252/9, 49.7, 74, 75, 252/78.3; 528/10, 30; 556/10, 401, 450, 453

[56] References Cited

U.S. PATENT DOCUMENTS

| | | | |
|---|---|---|---|
| 2,445,567 | 7/1948 | Elliott | 260/448.2 |
| 3,267,036 | 8/1966 | Baker et al. | 252/49.7 |
| 3,328,250 | 6/1967 | Omietanski et al. | 260/46.5 |
| 3,884,950 | 5/1975 | Koda et al. | 260/448.2 |
| 4,070,343 | 1/1978 | Kishimoto et al. | 524/262 |
| 4,122,109 | 10/1978 | Halm | 260/448.2 |
| 4,193,885 | 3/1980 | Halm | 252/78.3 |
| 4,560,784 | 12/1985 | Mori et al. | 556/401 |

FOREIGN PATENT DOCUMENTS

| | | |
|---|---|---|
| 18457 | 5/1980 | Japan . |
| 14700 | 4/1981 | Japan . |
| 46543 | 11/1984 | Japan . |
| 60-163966 | 8/1985 | Japan . |

*Primary Examiner*—Robert A. Wax
*Attorney, Agent, or Firm*—Roger H. Borrousch

[57] ABSTRACT

A mixture of an organopolysiloxane fluid, a zirconium-containing organosiloxane compound having at least one zirconium atom and at least one siloxane unit, and a cerium-containing organosiloxane compound having at least one cerium atom and at least one siloxane unit is an organopolysiloxane viscous coupler fluid which can be used in gear systems. These coupler fluids undergo little viscosity increase or decrease and little torque variation at elevated temperature and under high shear over long periods of time.

9 Claims, No Drawings

ORGANOPOLYSILOXANE VISCOUS COUPLER FLUIDS

BACKGROUND OF THE INVENTION

1. Field of the Invention

The present invention relates to an organopolysiloxane composition for viscous fluid coupling. More specifically, the present invention relates to an organopolysiloxane viscous fluid coupler which undergoes little upward or downward variation in viscosity at elevated temperatures under higher shear and which is therefore stable for long periods of time.

2. Background Information

The proper viscosity, a high flash point, oxidation stability, stability against thermal decomposition, and a low temperature dependence on the part of the viscosity are required of fluids used as viscous coupler fluids. Therefore, fluid dimethylpolysiloxanes have generally been used heretofore.

However, fluid polydimethylsiloxanes alone may suffer from deterioration, such as an increase in viscosity or gelation, etc., after a certain period of time due to the heat generated by the violent shear forces and the friction in a fluid coupler. As a result, they lose their ability to function as coupler fluids.

Due to this, various improvements have been implemented in order to increase their shear stability and heat resistance. For example, functional fluids which are relatively stable with respect to viscosity increases and gelation at elevated temperatures under high shearing forces are disclosed in U.S. Pat. No. 2,445,567, issued July 20, 1948, to Elliott which describes an organopolysiloxane fluid which contains the iron salt of an organic acid; U.S. Pat. No. 3,328,350, which describes an amine compound-containing organopolysiloxane fluid; and Japanese Patent Publication No. 55-18457 [80-18457], published May 19, 1980, Toray Silicone Co., Ltd. which describes an organopolysiloxane fluid which contains an N-phenylaminophenyl group-containing polysiloxane.

POINTS TO BE RESOLVED BY THE INVENTION

However, although these previously known methods do suppress a viscosity increase, as well as gelation, the organopolysiloxane fluid may still suffer a significant decline in viscosity after long-term application as a coupler fluid. As a result, torque variations arise or the motive force is inadequately transmitted and the fluid coupling function is lost.

The goal of the present invention is to eliminate the above-mentioned drawbacks by providing an organopolysiloxane viscous coupler fluid which undergoes little viscosity increase of decrease and little torque variation at elevated temperatures under high shear and which is stable for long periods of time.

SUMMARY OF THE INVENTION

The present invention relates to an organopolysiloxane viscous coupler fluid comprising (a) an organopolysiloxane fluid having the average unit formula $$R_aSiO_{(4-a)/2}$$

in which R is a monovalent hydrocarbon radical and a has an average value of from 1.5 to 3.0. (b) a zirconium-containing organosiloxane compound having in each molecule at least one zirconium atom and at least one siloxane unit of the formula $$R^1{}_bSiO_{(4-b)/2}$$

in which $R^1$ is a monovalent hydrocarbon radical and b is an integer of from 1 to 3 inclusive, where said zirconium-containing organosiloxane contains from 0.001 to 1.0 weight percent zirconium atom based on the weight of component (a), and (c) a cerium-containing organosiloxane compound have in each molecule at least one cerium atom and at least one siloxane unit of the formula $$R^2{}_cSiO_{(4-c)/2}$$

in which $R^2$ is a monovalent hydrocarbon radical and c is an integer of from 1 to 3, where said cerium-containing organosiloxane contains from 0.001 to 1.0 weight percent cerium atom based on the weight of component (a).

DESCRIPTION OF THE PREFERRED EMBODIMENTS

Component (a) used in the present invention has the average unit formula $$R_aSiO_{(4-a)/2}.$$

In the preceding formula, R is a monovalent hydrocarbon radical and examples are alkyl radicals such as methyl, ethyl, propyl, and butyl; substituted alkyl radicals such as 2-phenylethyl, 2-phenylpropyl, and 3,3,3-trifluoropropyl; alkenyl radicals such as vinyl and propenyl; aryl radicals such as phenyl, tolyl, and xylyl; and substituted aryl groups. Alkyl and aryl radicals are preferred and, in particular, methyl and phenyl are particularly preferred. In addition, this component may contain a small quantity of Si-bonded hydrogen atoms, Si-bonded hydroxyl groups, or Si-bonded alkoxy groups. a is a number in the range of 1.5 to 3.0, preferably a value to give a polydiorganosiloxane.

The structure of (a) is straight chain, branched chain, cyclic, or network; however, it is preferably straight chain or branched chain. The terminals of (a) are advantageously blocked with triorganosilyl groups such as trialkylsiloxy, alkoxydialkylsiloxy, and vinyldialkylsiloxy or, hydroxyl groups such as hydroxyldimethylsiloxy and hydroxylmethylphenylsiloxy.

The viscosity of (a) is arbitrary, but it is preferably 0.0001 to 0.05 meters squared per second (m²/s) and more preferably 0.0005 to 0.02 m²/s at 25° C. from the standpoint of a satisfactory torque transmission.

Examples of (a) are
trimethylsiloxy-terminated dimethylpolysiloxanes,
dimethylvinylsiloxy-terminated dimethylpolysiloxanes,
trimethylsiloxy-terminated dimethylsiloxanemethylvinylsiloxane copolymers,
trimethylsiloxy-terminated dimethylsiloxanemethylphenylsiloxane copolymers,
trimethylsiloxy-terminated methylphenylpolysiloxanes,
hydroxyl-terminated dimethylpolysiloxanes,
hydroxyl-terminated dimethylsiloxane-methylphenylsiloxane copolymers, and
mixtures of 2 or more of these, possibly with different viscosities and/or structures.

Component (b) used in the present invention is a zirconium-containing organosiloxane compound which contains, in each molecule, at least one zirconium atom and at least one unit with the formula $$R^1{}_b SiO_{(4-b)/2}.$$

$R^1$ is a monovalent hydrocarbon radical which is the same as for R in component (a). b is an integer with a value of 1 to 3. The molecular structure of (b) must be straight chain, branched chain, or cyclic and the terminals are advantageously blocked with hydroxyl, trialkylsiloxy, alkoxy, or alkenyl groups. The viscosity, molecular weight, and zirconium atom content per molecule are selected as appropriate, but (b) is advantageously liquid at room temperature for ease of mixing.

Component (b) may be produced by any method known from the art. For example, the zirconium-containing organosiloxane compound of (b) is readily obtained by heating a mixture of a trimethylsiloxy-terminated polydimethylsiloxane and an organozirconium compound possessing zirconium-oxygen-carbon bonds under an inert gas atmosphere, by reacting a zirconium alkoxide with a hydroxyl-terminated organopolysiloxane or, alternatively, by reacting a zirconium halide with an alkali metal silanolate (refer to U.S. Pat. No. 4,193,885, issued Mar. 18, 1980, to Halm and Japanese Patent Publication No. 56 [1981]-14700, published Apr. 6, 1981, to Toray Silicone Co., Ltd.). Component (b) is added at 0.001 to 1.0 weight percent and preferably 0.001 to 0.1 weight percent as zirconium based on component (a).

Component (c) used in the present invention is a cerium-containing organosiloxane compound which contains, in each molecule, at least one cerium atom and at least one unit with the formula $$R^2{}_c SiO_{(4-c)/2}.$$

$R^2$ is a monovalent hydrocarbon radical which is the same as those cited for R in component (a). c is an integer with a value of 1 to 3. Component (c) is straight chain, branched chain, cyclic, or network and its terminals are advantageously blocked with hydroxyl, trialkylsiloxy, alkoxy, or alkenyl groups. The viscosity, molecular weight, and cerium atom content per molecule are selected as appropriate, but (c) is advantageously a liquid at room temperature for ease of mixing.

Component (c) can be produced by any method known from the art. For example, it is easily obtained by reacting the cerium salt of an organic carboxylic acid with an alkali metal silanolate with at least three organosiloxane units or by reacting a cerium organocarboxylate soluble in aromatic or chlorinated hydrocarbons with hexamethyldisilazane, etc., refer to U.S. Pat. Nos. 3,884,950, issued May 20, 1975, to Koda et al. and 4,070,343, issued Jan. 24, 1978, to Kishimoto et al. and Japanese Kokai [Laid-Open] Patent No. 54 [1979]-32563, published Mar. 9, 1979, to Shin-etsu Chemical Co., Ltd.

Component (c) is added at 0.001 to 1.0 weight percent and preferably 0.001 to 0.1 weight percent as cerium based on component (a).

The composition of the present invention is produced by simply mixing the prescribed quantities of components (a), (b), and (c) to homogeneity. The order of mixing is arbitrary. Component (a) may be combined and mixed simultaneously or separately with component (b) and component (c) or, alternatively, component (b) may be combined and mixed to homogeneity first with component (c) and component (a) may then be added and mixed.

The composition of the present invention is applied by simply filling it into the fluid-coupled gear, which may be an open, semi-sealed, or sealed system.

In the organopolysiloxane viscous coupler fluid of this invention, the organopolysiloxane fluid of component (a) is the principal agent of the composition. The zirconium-containing organosiloxane compound of component (b) is compatible with component (a) and prevents any reduction in the molecular weight of the organopolysiloxane fluid of (a) caused by depolymerization. The cerium-containing organosiloxane compound of component (c) is compatible with component (a) and prevents increases in the molecular weight of the organopolysiloxane fluid of (a) caused by oxidation. In combination, components (b) and (c) thus prevent a decline or increase in the molecular weight of the organopolysiloxane fluid of (a) at elevated temperatures and high shear, thus functioning to regulate the viscosity at a constant value.

The present invention will be explained in detail using a reference example and demonstrational examples. "Parts" and "%" in the reference example and demonstrational examples are "weight parts" and "wt %," respectively, and the viscosity was measured at 25° C.

REFERENCE EXAMPLE

Compound I

10 Parts of a mineral oil solution (containing 6% zirconium) or zirconium octanoate and 25 parts of a trimethylsiloxy-terminated polydimethylsiloxane having a viscosity of 0.00002 m²/s were placed in a reactor and then heated at 120° C. under a nitrogen stream for 4 hours to distill the mineral oil. The mixture in the reactor was heated at 350° C. under a reduced nitrogen flow for 24 hours while a gaseous decomposition product was distilled. The product (22 parts) was cooled to room temperature and then filtered under nitrogen. The resulting reaction product (19.9 parts) was dark brown, transparent liquid which was confirmed to be a zirconium-containing organosiloxane compound from its zirconium content of 3.1% by elemental analysis and from the complete absence of an octanoate group in infrared absorption spectral analysis.

Compound II 6.5 Parts tetrabutoxyzirconium were dissolved in 120 parts dry toluene. 35 parts hydroxyl-terminated polydimethylsiloxane with a viscosity of 0.000035 m²/s were added and then heated at reflux with stirring for 3 hours. The toluene solvent and butanol by-product were distilled from the reaction solution under reduced pressure. The reaction product was then filtered under nitrogen. The resulting reaction product (38.8 parts) was a light brown, transparent liquid whose zirconium content was 2.8% from elemental analysis and was confirmed to be essentially a compound with the formula

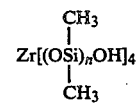

(n is 7 on average) or its partial condensation product by infrared absorption spectral analysis.

Compound III

To 67 parts trimethylsiloxy-terminated polydimethylsiloxane with a viscosity of 0.00001 m$^2$/s were added 0.3 part hexamethylphosphoramide as a reaction accelerator and 33 parts potassium silanolate (produced from potassium hydroxide and 2,4,6-trimethyl-2,4,6-triphenylcyclosiloxane). This was reacted at 115° C. under a nitrogen flow for 1 hour, cooled to room temperature and then completely dissolved in 150 parts isopropanol. 50 parts of an ethanol solution of anhydrous zirconium chloride (2 parts anhydrous zirconium chloride dissolved in 48 parts ethanol) was dripped into the above solution with stirring. The reaction product was filtered and the solvent was then distilled under reduced pressure. The residue was filtered again in order to obtain a light yellow, transparent liquid. The resulting reaction product had a zirconium concentration of 0.7 wt % from elemental analysis and was confirmed to be zirconium-containing organosiloxane compound (viscosity, 0.000012 m$^2$/s) by infrared absorption spectral analysis.

Compound IV

To 67 parts trimethylsiloxy-terminated polydimethylsiloxane with a viscosity of 0.00002 m$^2$/s were added 0.3 part hexamethylphosphoramide as a reaction accelerator and 33 parts potassium silanolate (obtained from potassium hydroxide, hexamethylcyclosiloxane, and octamethylcyclosiloxane) and this was reacted at 115° C. under a nitrogen flow for 1 hour. 120 parts dry xylene and 16 parts cerium 2-ethylhexanoate were added and then reacted at reflux for 2.5 hours. The reaction mixture was cooled to room temperature, neutralized by the addition of 3 parts trimethylchlorosilane, the solvent was distilled under reduced pressure, and the residue was then filtered. The resulting reaction product (95 parts) was a light yellow, transparent liquid and was confirmed to be an organosiloxane compound containing 1.2% cerium (viscosity, 0.0000198 m$^2$/s) by elemental analysis and infrared absorption spectral analysis.

Compound V

100 Parts of reaction solution produced as for Compound IV, obtained before the addition of the dry xylene and cerium 2-ethylhexanoate, were dissolved in 150 parts isopropanol. 100 Parts of an alcohol solution of anhydrous cerium chloride (25 parts anhydrous cerium chloride dissolved in a 50 parts ethanol and 47.5 parts isopropanol mixture) were dripped into this solution with stirring. The reaction mixture was filtered and then heated at 40° to 50° C. to distill the solvent. The residue was filtered again for purification. The resulting reaction product (98 parts) was a light yellow, transparent liquid and was confirmed to be an organosiloxane compound which contains 0.8% cerium (viscosity, 0.0000221 m$^2$/s) by elemental analysis and infrared absorption spectral analysis.

Compound VI

30 Parts xylene were mixed with 5 parts of a mineral oil solution (cerium content, 8%) of cerium octanoate, 5 parts hexamethyldisilazane, and 1 part water at room temperature for 2 hours and then heated at reflux for 2 hours. The solvent and unreacted water were then both distilled by heating. The reaction mixture was then cooled to room temperature and the residue was filtered. The product (6 parts) was a yellow, transparent liquid and was confirmed to contain about 20% cerium by elemental analysis. In addition, the product was confirmed to be essentially a compound with the formula $$Ce[OSi(CH_3)_3]_n$$

(where n=3 or 4) from the infrared absorption spectrum and nuclear magnetic resonance spectrum.

EXAMPLE

Six viscous coupler fluids, Fluids A through F were prepared as follows.

Fluid A

100 Parts trimethylsiloxy-terminated polydimethylsiloxane with a viscosity of 0.006 m$^2$/s were combined and mixed to homogeneity with 0.5 part Compound I and 0.4 part Compound IV at room temperature.

Fluid B

100 Parts trimethylsiloxy-terminated polydimethylsiloxane with a viscosity of 0.003 m$^2$/s were combined and mixed to homogeneity with 0.5 part Compound I and 0.8 part Compound V at room temperature.

Fluid C

100 Parts trimethylsiloxy-terminated polydimethylsiloxane with a viscosity of 0.01 m$^2$/s were combined and mixed to homogeneity with 0.8 part Compound II and 0.8 part Compound IV at room temperature.

Fluid D

100 Parts trimethylsiloxy-terminated dimethylsiloxanediphenylsiloxane copolymer with a viscosity of 0.005 m$^2$/s and a diphenylsiloxane unit content of 10 mol % were combined and mixed to homogeneity with 0.5 parts Compound II and 0.8 part Compound V at room temperature.

Fluid E

100 Parts hydroxyl-terminated polydimethylsiloxane with a viscosity of 0.005 m$^2$/s were combined and mixed to homogeneity with 0.5 part Compound III and 0.8 part Compound V room temperature.

Fluid F

100 Parts trimethylsiloxy-terminated dimethylsiloxane-methylphenylsiloxane copolymer with a viscosity of 0.003 m$^2$/s and containing 10 mol % methylphenylsiloxane units were combined and mixed to homogeneity with 1.5 parts Compound III and 0.01 parts Compound VI at room temperature.

Each of the Fluids A through F was filled into a fluid-coupled axle gear which was then continuously operated at 6500 rpm in order to examine the change in output rpm. Fluid in the gear was removed after continuous operation for 300 and 500 hours and its viscosity was measured. The results are reported in Table 1. Fluid-coupled gears using the composition of the present invention had an insignificant variation in rpm and the organopolysiloxane fluid exhibited almost no change in viscosity after continuous operation for as long as 500 hours. The organopolysiloxane composition of the present invention was thus judged to be an excellent organopolysiloxane viscous coupler fluid.

The temperature within the coupler fluid averaged 250° C., occasionally rising to 300° C., during continuous operation.

COMPARISON EXAMPLE 1

Six fluid compositions, Fluids J through O, were prepared as comparison examples as follows.

Fluid J

This had the same composition as Fluid A of the Example with the exception that Compound IV was not added.

Fluid K

This had the same composition as Fluid B of the Example with the exception that Compound I was not added.

Fluid L

This had the same composition as Fluid C of the Example with the exception that Compound IV was not added.

Fluid M

This had the same composition as Fluid D of the Example with the exception that Compound II was not added.

Fluid N

This had the same composition as Fluid E of the Example with the exception that Compound II was not added.

Fluid O

This had the same composition as Fluid F of the Example with the exception that Compound VI was not added.

Each of the 6 Fluids, J to O, was filled into a fluid-coupled axle gear which was then continuously operated at 6500 rpm in order to examine the change in output rpm. In addition, gear fluid was extracted after continuous operation for 300 and 500 hours and its viscosity was measured. The results are reported in Table 2. All the fluids underwent significant gelation or viscosity changes and could not withstand continuous operation for 500 hours. As a result, these fluids were judged to be poor viscous fluid coupling compositions.

The temperature within the coupler averaged 250° C. during continuous operation.

TABLE 1

The Present Invention

| Fluid | Output rpm | | | | | Fluid Viscosity in m²s | |
|---|---|---|---|---|---|---|---|
| | 1 hour | 50 hours | 100 hours | 300 hours | 500 hours | 300 hours | 500 hours |
| A | 4210 | 4200 | 4190 | 4200 | 4230 | 0.00571 | 0.00637 |
| B | 3930 | 3910 | 3900 | 3890 | 3900 | 0.00280 | 0.00286 |
| C | 4820 | 4820 | 4830 | 4850 | 4890 | 0.01080 | 0.01110 |
| D | 4050 | 4020 | 4000 | 3990 | 4101 | 0.00473 | 0.00488 |
| E | 4170 | 4170 | 4190 | 4230 | 4300 | 0.00536 | 0.00598 |
| F | 3900 | 3890 | 3880 | 3870 | 3870 | 0.00289 | 0.00291 |

TABLE 2

Comparison Examples

| Fluid | Output rpm | | | | | Fluid Viscosity in m²s | |
|---|---|---|---|---|---|---|---|
| | 1 hour | 50 hours | 100 hours | 300 hours | 500 hours | 300 hours | 500 hours |
| J | 4200 | 4250 | 4700 | * | — | — | — |
| K | 3930 | 3920 | 3410 | 3130 | * | 0.00196 | — |
| L | 4820 | 4750 | 5870 | * | — | — | — |
| M | 4040 | 3730 | 3400 | 3090 | 3510 | 0.00264 | 0.00493 |
| N | 4170 | 4010 | 4190 | * | — | — | — |
| O | 3910 | 3880 | 4320 | * | — | — | — |

* = occurrence of gelation

COMPARISON EXAMPLE 2

100 Parts of trimethylsiloxy-terminated polydimethylsiloxane with a viscosity of 0.006 m²/s were combined and mixed to homogeneity with 0.5 part of an organopolysiloxane (Compound VII) of the formula

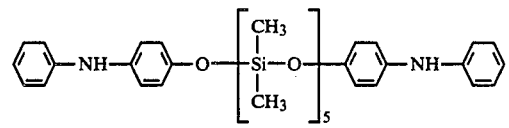

at room temperature. The resulting composition was filled into a fluid-coupled gear which was then continuously operated as described in the Example; however, it was found to be gelled at 250 hours and could not withstand long-term operation. The temperature within the coupler fluid averaged 250° C. during continuous operation.

COMPARISON EXAMPLE 3

55 Parts trimethylsiloxy-terminated polydimethylsiloxane with a viscosity of 0.02 m²/s were mixed at room temperature with 45 parts trimethylsiloxy-terminated polydimethylsiloxane with a viscosity of 0.0001 m²/s and 0.5 part Compound VII in order to produce a fluid with a viscosity of 0.003 m²/s. This composition was filled into a fluid-coupled gear which was then continuously operated at 6500 rpm as described in the Example; however, it was found to have gelled at 350 hours and could not withstand long-term operation. The temperature within the coupler fluid averaged 250° C. After operation for 300 hours, the fluid had a viscosity of 0.0026 m²/s and had undergone a decline in viscosity.

COMPARISON EXAMPLE 4

Trimethylsiloxy-terminated polydimethylsiloxane with a viscosity of 0.006 m²/s was filled into a fluid-coupled gear which was then continuously operated as described in the Example; however, it was gelled at 100 hours and could no longer exhibit a torque-transmitting function. The temperature within the coupler fluid was 250° C. on average during continuous operation.

EFFECTS OF THE INVENTION

As discussed above, the organopolysiloxane viscous coupler fluid of the present invention contains both a zirconium-containing organosiloxane compound and a cerium-containing organosiloxane compound and it is extremely stable. It does not undergo a decline or increase in viscosity or gelation at elevated temperatures under high shear for long periods of time.

Fluid-coupled gears filled with the organopolysiloxane viscous coupler fluid of the present invention undergo little torque variation in practical applications over long periods of time which makes said composition extremely useful in industrial practice.

That which is claimed is:

1. An organopolysiloxane viscous coupler fluid comprising
   (a) an organopolysiloxane fluid having the average unit formula

in which R is a monovalent hydrocarbon radical and a has an average value of from 1.5 to 3.0
   (b) a zirconium-containing organosiloxane compound having in each molecule at least one zirconium atom and at least one siloxane unit of the formula

in which $R^1$ is a monovalent hydrocarbon radical and b is an integer of from 1 to 3 inclusive, where said zirconium-containing organosiloxane contains from 0.001 to 1.0 weight percent zirconium atom based on the weight of component (a), and (c) a cerium-containing organosiloxane compound having in each molecule at least one cerium atom and at least one siloxane unit of the formula $$R^2_c SiO_{(4-c)/2}$$

in which $R^2$ is a monovalent hydrocarbon radical and c is an integer of from 1 to 3, where said cerium-containing organosiloxane contains from 0.001 to 1.0 weight percent cerium atom based on the weight of component (a).

2. The organopolysiloxane viscous coupler fluid according to claim 1 in which (a) is a linear organopolysiloxane in which R is a monovalent hydrocarbon radical selected from the group consisting of alkyl and aryl and the viscosity of the organopolysiloxane is in the range of from 0.0001 to 0.05 meters squared per second, (b) is present in an amount of from 0.001 to 0.1 weight percent zirconium based on the weight of (a) and $R^1$ is alkyl, and (c) is present in an amount of from 0.001 to 0.1 weight percent cerium based on the weight of (a) and $R^2$ is alkyl.

3. The organopolysiloxane viscous coupler fluid according to claim 2 in which the viscosity of (a) is in the range of from 0.0005 to 0.02 meters squared per second.

4. The organopolysiloxane viscous coupler fluid according to claim 3 in which the siloxane units of the organopolysiloxane of (a) are those in which R is methyl.

5. The organopolysiloxane viscous coupler fluid according to claim 3 in which the siloxane units of the organopolysiloxane of (a) are those in which some R are methyl and some R are phenyl.

6. The organopolysiloxane viscous coupler fluid according to claim 3 in which the zirconium-containing organosiloxane compound of (b) contains from 0.5 to 5 weight percent zirconium and the cerium-containing organosiloxane compound of (c) contains from 0.5 to 25 weight percent cerium.

7. The organopolysiloxane viscous coupler fluid according to claim 4 in which (a) is trimethylsiloxy endblocked polydimethylsiloxane, the zirconium-containing organosiloxane compound of (b) contains from 0.5 to 5 weight percent cerium, and the cerium-containing organosiloxane compound of (c) contains from 0.5 to 5 weight percent cerium.

8. The organopolysiloxane viscous coupler fluid according to claim 3 in which (a) is trimethylsiloxy endblocked polydiorganosiloxane having dimethylsiloxane units and units selected from the group consisting of diphenylsiloxane units and methylphenylsiloxane units, the zirconium-containing organosiloxane compound of (b) contains from 0.5 to 5 weight percent zirconium, and the cerium-containing organosiloxane compound of (c) contains from 0.5 to 25 weight percent cerium.

9. The organopolysiloxane viscous coupler fluid according to claim 3 in which (a) is a hydroxyl endblocked polydimethylsiloxane, the zirconium-containing organosiloxane compound of (b) contains from 0.5 to 2 weight percent zirconium, and the cerium-containing organosiloxane compound contains from 0.5 to 2 weight percent cerium.

* * * * *

UNITED STATES PATENT AND TRADEMARK OFFICE
CERTIFICATE OF CORRECTION

PATENT NO. : 4,637,889

DATED : January 20, 1987

INVENTOR(S) : Keiichi Kishimoto
Makoto Yoshitake

It is certified that error appears in the above-identified patent and that said Letters Patent is hereby corrected as shown below:

In Column 1, line 55, the words "increase of decrease" should read "increase or decrease".

In Column 1, line 67, the number "3.0." should read "3.0". (The period needs to be deleted after the 0)

Signed and Sealed this

Fifteenth Day of September, 1987

Attest:

DONALD J. QUIGG

Attesting Officer

Commissioner of Patents and Trademarks